(12) United States Patent
Schönnenbeck et al.

(10) Patent No.: US 7,134,356 B2
(45) Date of Patent: Nov. 14, 2006

(54) CONVEYOR GEAR WITH RETURN LOCK

(75) Inventors: Gert Schönnenbeck, Neu-Anspach (DE); Peter Faust, Mücke (DE); Marcel Offermann, Bad Homburg v.d. Höhe (DE); Peter Janssen, Neu-Anspach (DE)

(73) Assignee: PIV Drives GmbH, Bad Homburg (DE)

(*) Notice: Subject to any disclaimer, the term of this patent is extended or adjusted under 35 U.S.C. 154(b) by 167 days.

(21) Appl. No.: 11/036,287

(22) Filed: Jan. 18, 2005

(65) Prior Publication Data
US 2005/0176554 A1 Aug. 11, 2005

(30) Foreign Application Priority Data
Jan. 23, 2004 (DE) .................. 10 2004 003 393

(51) Int. Cl.
*F16H 57/10* (2006.01)
(52) U.S. Cl. ..................................... 74/411.5
(58) Field of Classification Search ............ 192/223.2, 192/223, 223.1, 223.3, 223.4; 74/411.5; 198/781.07, 791, 832, 832.2
See application file for complete search history.

(56) References Cited

U.S. PATENT DOCUMENTS 4,697,675 A * 10/1987 Johnson et al. ............. 192/223
6,845,857 B1 * 1/2005 Matsuo et al. ............. 192/223

FOREIGN PATENT DOCUMENTS

| DE | 2913709 | 10/1980 |
| DE | 3245347 | 5/1983 |
| DE | 4002280 | 8/1991 |
| DE | 2991586 | 2/2000 |
| DE | 19860571 | 7/2000 |

* cited by examiner

*Primary Examiner*—Dirk Wright
(74) *Attorney, Agent, or Firm*—Egbert Law Offices

(57) ABSTRACT

The invention relates to a gear for conveyors which has a drive shaft to which a drive motor is to be fastened as well as an output shaft with which the gear is connected to the conveyor. However, at least one gear step is provided within the gear. Moreover, the gear is provided with a freewheel locking in one direction of rotation. A second gear step is provided in this case between the freewheel and the elements transmitting torque between drive and output shaft during normal operation, so that the freewheel should be operated at a higher speed and must only provide a low holding moment in the event of a stoppage.

4 Claims, 4 Drawing Sheets

CONVEYOR GEAR WITH RETURN LOCK

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a gear mechanism for a conveyor having a drive shaft for connection with a drive motor, an output shaft for connection with a conveyor, at least one first gear step between drive shaft and output shaft, and a freewheel which locks in one direction of rotation.

BACKGROUND OF THE INVENTION

For the purposes of this invention, conveyors are conveyor belts, bucket conveyors, hydraulic screws and hydraulic turbines, etc. with which material to be conveyed is only to be transported in one direction. When this conveyor comes to a standstill, it must thereby be ensured that any material still in, at or on the conveyor does not move the conveyor back opposite the usual direction of conveyance due to the force of gravity.

For this purpose, it is known, for example, to provide freewheels as return locks on drives of conveyor belts. They prevent a drive shaft for the conveyor belt from being able to rotate opposite a preset direction of rotation, for example, during a power failure of a drive motor.

However, nowadays, freewheels of this type are very expensive components which also increase over-proportionately in price with their size.

From this point of view, an arrangement of the freewheel on the drive shaft would be desirable since it runs the quickest. However, this is not possible for reasons of accessibility (maintenance, repair), in particular in tapered spur-gear systems.

For this reason, in a gear arranged between drive motor and the actual conveyor belt drive shaft, it is common to place the freewheel on an intermediate shaft between drive axis and output axis instead of on the output axis. In intermediate shafts of this type which are situated between quickly running drive shaft and slowly rotating output shaft, the torque which is to be maintained in the case of a stoppage and is inversely proportional to the rotational speed is less than the output shaft. Accordingly, a smaller freewheel can be selected.

However, it was shown that three-speed gears are often used for this reason as gears alone instead of two-speed gears, so that the speed of the gear train which supports the freewheel can run especially quickly, i.e. with a low torque, in order to be able to thus use an inexpensive freewheel. However, this also results in an additional step in the output flow, which results in an unintentional power loss. In particular, with a power loss of this kind, a larger housing must be provided in turn, so that the power loss produced can be diverted.

Accordingly, the object of the present invention is to further develop a gear for a conveyor as described above such that a smaller and thus more economical freewheel can be used without unnecessarily increasing the cost of the actual gear line by providing additional intermediate steps.

According to the invention, this object is solved in that there is at least one second gear step, which only drives the freewheel, between the freewheel and the elements transmitting the torque between drive and output shaft during operation of the gear.

BRIEF SUMMARY OF THE INVENTION

The advantage of the invention is that, as a result of the second gear step, the arrangement of the freewheel is not limited to positions which are preset by shafts situated in the gear. Rather, the freewheel can not be positioned relatively freely.

Moreover, for example, it is also possible that the transmission ratio in a gear which was thus far designed as a three-speed gear in order to be able to provide a freewheel is now only in the form of a two-speed gear, as a result of which a cost advantage can be obtained. Since the second gear step by means of which the freewheel is driven is only to be designed for a static load and not for a dynamic one, it can be made very easily and inexpensively, so that an overall more inexpensive gear can be produced in spite of the second gear step to be provided.

Preferably, the second gear step has a transmission ratio of 1:1 or a speed-increasing one. With a transmission ratio of 1:1, it is thereby preferably coupled directly to the drive shaft. However, the second gear step can also be directly coupled to the drive shaft with a speed-increasing drive.

On the one hand, the advantage of this embodiment is that an especially low torque acts on the freewheel in the event of an stoppage. As a result, it can be selected relatively small and thus inexpensive.

Furthermore, in particular the speed-increasing drive also has the advantage that, as a result of it, the freewheel already reaches the speed ranges in which the spring-loaded locking elements that exist there lift off due to centrifugal forces at low rotational speeds of the gear. As a result, said locking elements no longer drag over the shaft which they are to lock in normal operation.

As a result, less power loss is also produced in normal operation by the freewheel and it is also no longer necessary to ensure that the freewheel be cooled by a splash lubrication which generates additional resistance. A normal splash lubrication is sufficient in this case.

In an especially preferred embodiment, the second gear step is configured as a planetary gear. An especially compact construction can be obtained with this.

BRIEF DESCRIPTION OF THE SEVERAL VIEWS OF THE DRAWINGS

Further advantages and features of the invention can be found in the following description of examples of embodiments.

FIG. 4 shows a basic sketch of a tapered spur-gear according to the prior art. One can see a gear housing 1 on which a drive shaft 2 is mounted.

DETAILED DESCRIPTION OF THE INVENTION

Figure 1:
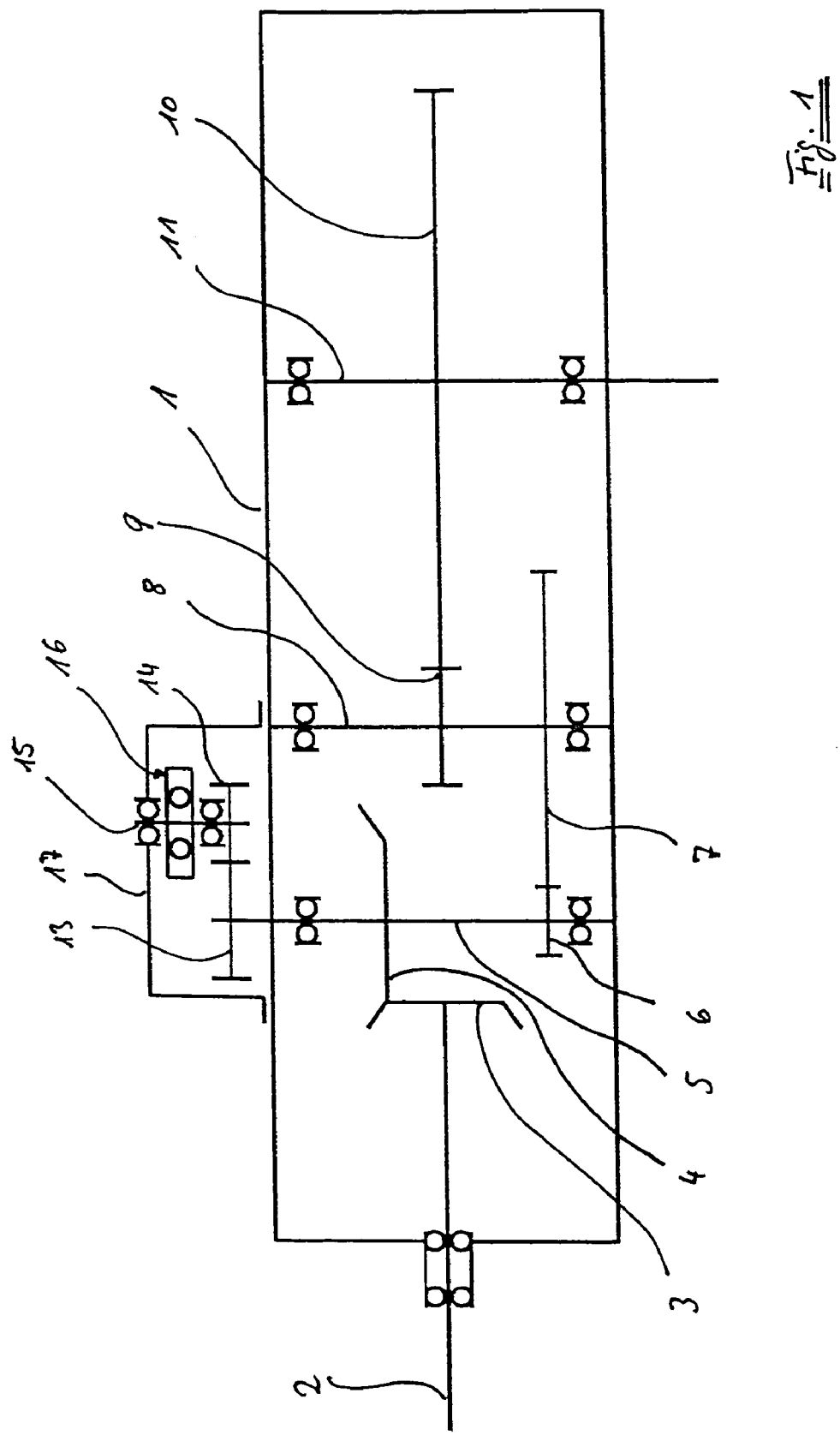
FIG. 1 is a schematic view of a tapered spur-gear according to the invention.

A shaft of this type is mounted in a manner known to a person skilled in the art or science via roller bearings. This mounting as well as the mounting of the shafts mentioned below will not be described in greater detail.

The drive shaft should be connected in the usual manner to a motor (not shown) at the end facing away from the gear.

At the end opposite the motor, the drive shaft 2 supports a first bevel gear 3 which mates with a second bevel gear 4, whereby the speed is reduced. The bevel gear 4 is firmly fixed on a first shaft 5 on which a first pinion 6 also sits. The first pinion 6 mates with a first cogwheel 7 which sits on an intermediate shaft 8 which also carries a second pinion 9. Said second pinion 9, in turn, mates with a second cogwheel 10 output shaft 11. Said output shaft is, in turn, led out of the gear housing 1 and connected with a conveyor (not shown), e.g. a conveyor belt, a screw conveyor or the like. The gear steps described thus far are considered to be the first gear steps within the scope of the description in this case, via which torque is transmitted from the drive motor to the drive shaft during operation. This torque transmission is dynamically loaded, so that these first gear steps are also designed for the dynamic load.

In order that the material to be conveyed which is still on the aforementioned conveyor does not move in the opposite direction due to gravitational force when the motor attached to the drive shaft 2 breaks down, a freewheel 12 is present as return lock on the gear shown here. It sits on the first shaft 5 and enables the gear to be floating in a direction of rotation of the first shaft 5, while the gear is locked by the freewheel 12 in the opposite direction of rotation of the first shaft 5.

The freewheel 12 is thereby flanged on a lateral surface of the gear housing 1. The special advantage of this is that the freewheel is easily accessible for maintenance purposes. Moreover, it is thus also possible to be able to install the freewheel inversely, so that a free rotation of the gear is made possible in an opposite direction in the event that the gears are used in another type of installation.

The freewheel 12 shown is relatively expensive due to its size. It must have this size to enable it to be mounted on the first shaft 5 and to be able to maintain torques occurring on the shaft 5.

Figure 4:
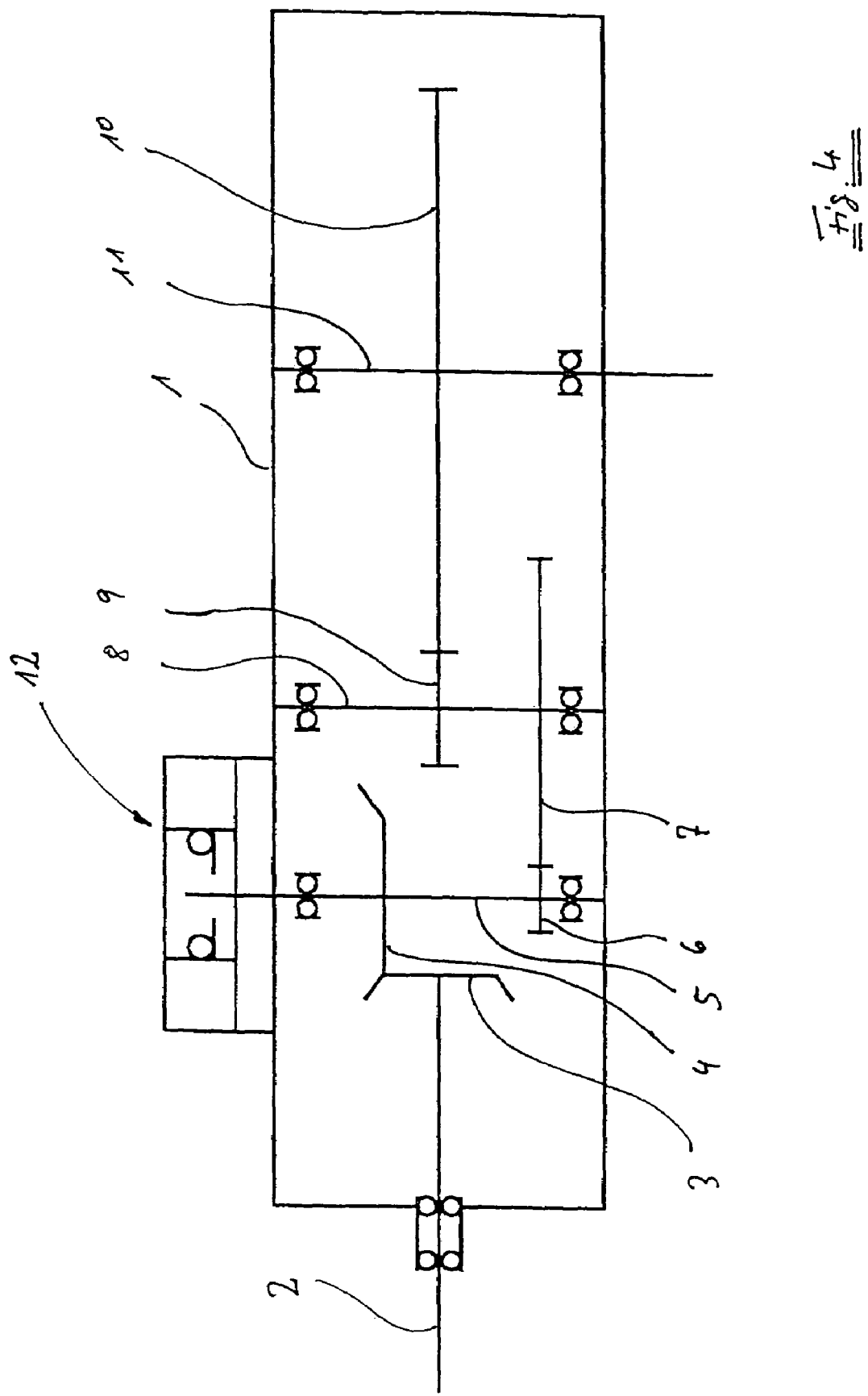
FIG. 4 is a schematic view of a tapered spur-gear according to the prior art.

Thus, a further development according to the invention of a gear of the prior art according to FIG. 4 is shown in FIG. 1. The same elements are designed with the same reference numbers in this gear.

In the example shown here, a cogwheel 13 is mounted on the free end of the first shaft 5 extending out of the gear housing 1, said cogwheel 13 together with a pinion 14 forming a second gear step which increases in speed. In this case, the pinion 14 sits on a freewheel shaft 15 which interacts with the freewheel 16. The freewheel 16 is thereby supported by a flange-mounted housing 17 which is in turn fastened to the housing 1.

It is now essential to see that the second gear step formed by the cogwheel 13 and the pinion 14 increases in speed, so that the freewheel shaft 15 rotates at a higher speed than the first shaft 5 in the gear. As a result, a holding torque acting on the shaft 5 during a standstill is also reduced accordingly when led through this second gear step to the locking freewheel 16 and, thus, the freewheel 16 can also be made smaller since it must only be able to apply a smaller holding moment in comparison to the freewheel 12 described above.

It should thereby also be taken into consideration that no torque is transmitted via the second gear step 13, 14 and the freewheel shaft 15 in the normal operation of the gear, but only in the event that a return movement is to be prevented when the gear is stopped. Therefore, it is sufficient to design the second gear step 13, 14 and the freewheel shaft 15 from static points of view. This can be solved very economically from a structural point of view.

Furthermore, due to the higher speed of the freewheel shaft 15, it is also attained that the locking elements within the freewheel 16 are exposed to relatively high speeds when the gear is operated, so that they lift due to centrifugal forces acting in this case. As a result, the freewheel 16 can be operated in a manner that is easier on the material and lower in loss due to the fact that the locking elements no longer drag on the freewheel shaft 15. Thus, it is also sufficient to simply provided the freewheel 16 with oil by means of a splash lubrication, while, with an embodiment in the prior art, the freewheel 12 had to be operated in an oil bath to reduce the wear and heat flow which caused further power losses.

Figure 2:
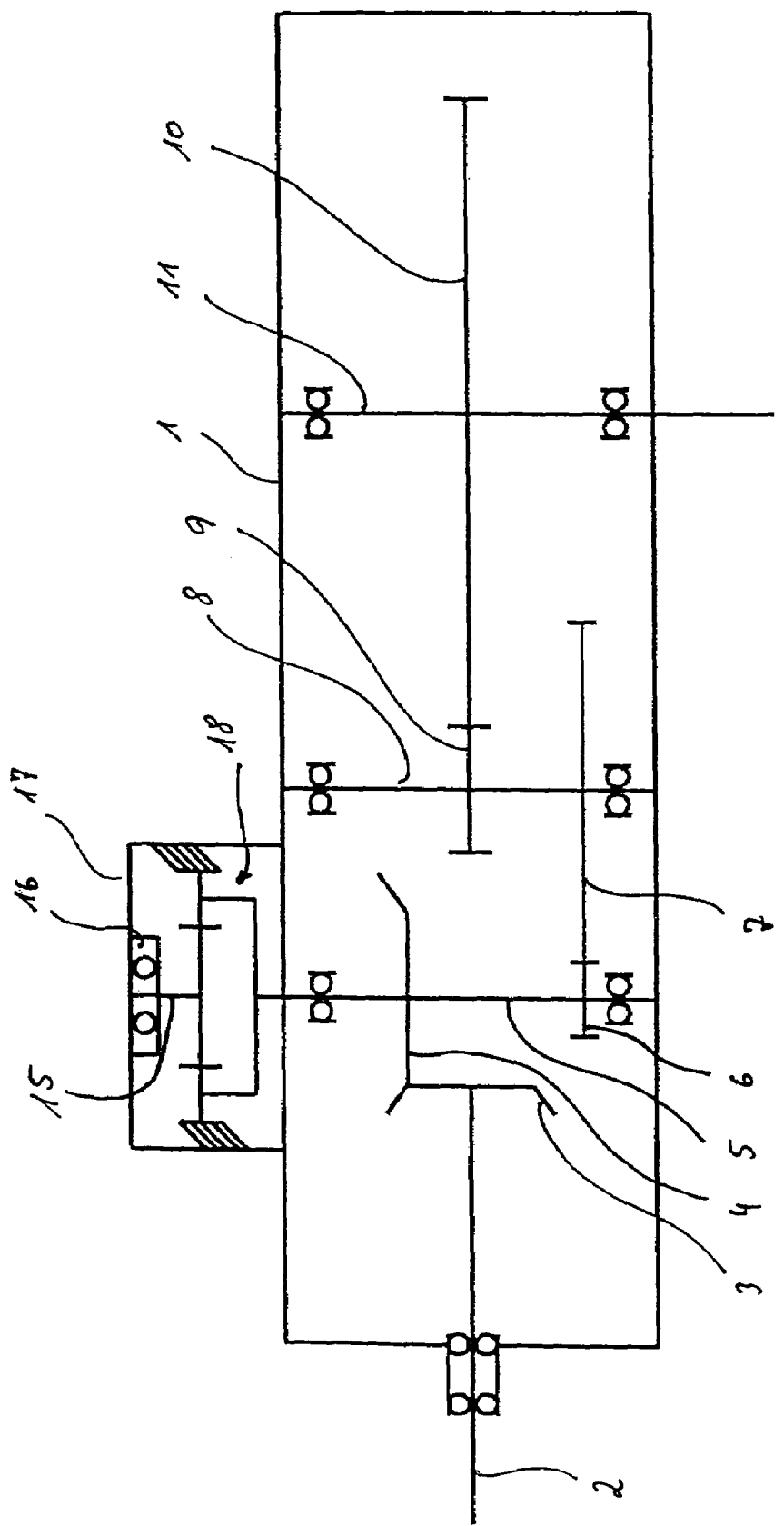
FIG. 2 is another schematic view of a tapered spur-gear according to the invention with a freewheel coupled via a planetary gear.

An alternative embodiment for mounting a freewheel is shown in FIG. 2. In this case also, the same elements are designated with the same reference numbers. It can be seen that, in the existing flange-mounted housing 17, the freewheel 16 is connected via a planetary gear 18 with the first shaft 5 in the gear. By a corresponding transmission between planetary and sun wheels, a corresponding increase in speed for the freewheel shaft 15 can be obtained, so that in this case also the freewheel shaft 15 also has a higher speed than the first shaft 5 in the gear. As a result, the freewheel 16 should also be operated at a higher speed in this case, said speed being accompanied by a lower holding torque during a standstill of the gear.

In the example shown here, the freewheel also again has the property that the locking elements lift off from the freewheel shaft during normal gear operation and, as a result, there is a lower wear and lower power losses.

Figure 3:
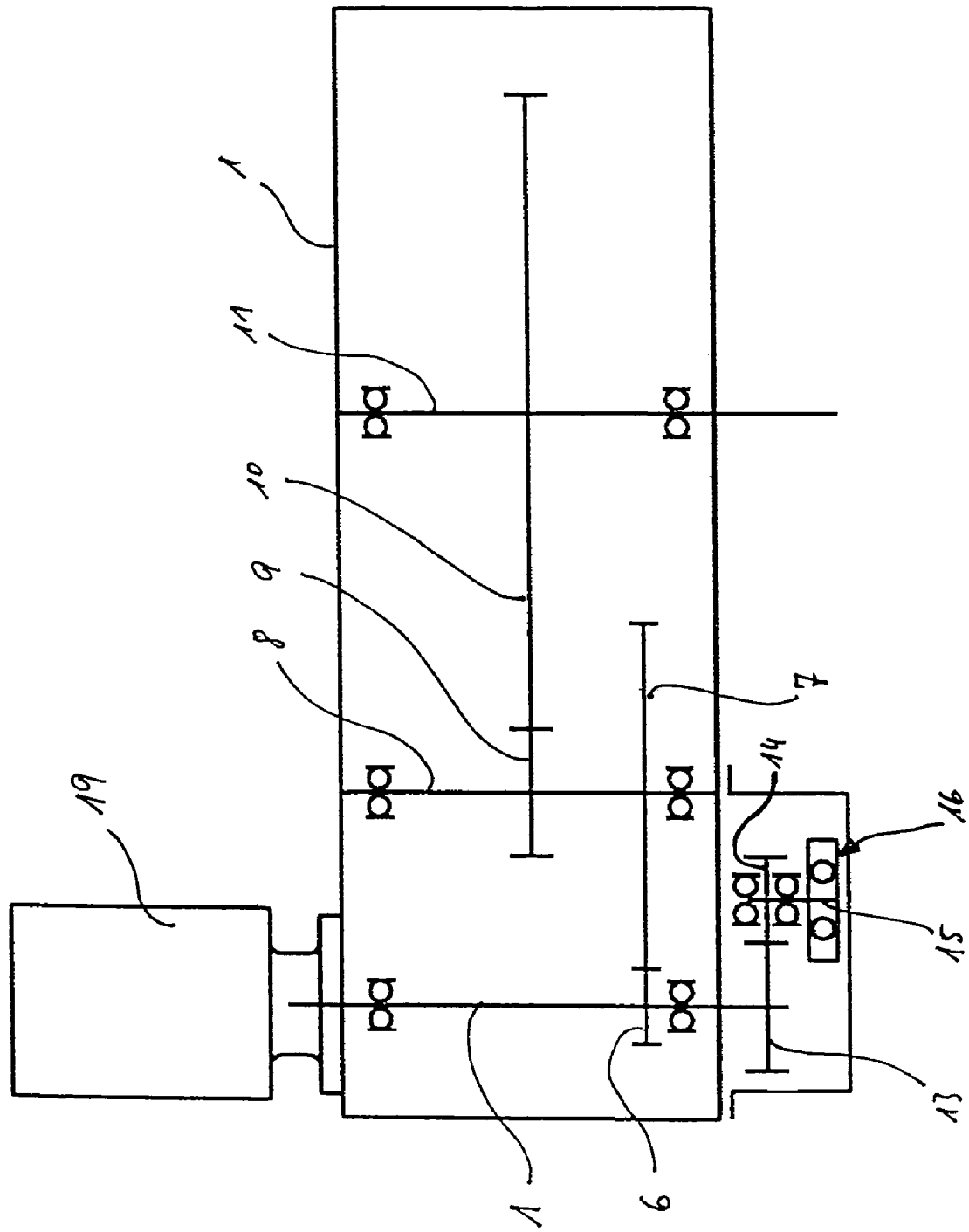
FIG. 3 is another schematic view of a spur-gear system according to the invention.

A further alternative embodiment of a gear according to the invention is shown in FIG. 3. In this case also, the same elements are designated with the same reference numbers. However, in this example, this is a pure spur-gear system in which the drive shaft 1 corresponds to the first shaft 5 in the embodiments of FIGS. 1 and 2. In this example, therefore, the drive shaft 2 directly carries the first pinion 6 which mates with the first cogwheel 7 on the intermediate shaft 8 which, in turn, carries the second pinion 9 via which the torque in the gear is then transmitted to the second cogwheel 10 and thus the output shaft 11.

In the example shown here, the drive shaft 2 is provided with a cogwheel 13 on the end opposite the end connected with the motor 19 (shown here), said cogwheel 13 together with a pinion 14 rotating the freewheel shaft 15 at an increased speed, so that the freewheel 16 can again be selected smaller than in the example according to FIG. 4 of the prior art, since it rotates at a higher speed.

In this case also, no torque is transmitted via the gear step formed by the cogwheel 13 and the pinion 14 during normal operation of the gear. A static holding moment is not transmitted via this second gear step until the motor 19 breaks down or is switched off. In this case in particular, it can be seen that this second gear step is connected with the drive shaft without any other elements being interconnected which transmit torque between drive shaft and output shaft during operation of the gear. Elements of this type are formed by the bevel gear set 3, 4 in the gears shown in FIGS. 1 and 2.

The omission of the elements found between the drive shaft and second gear step has the special advantage that the initial speed for the second gear step formed from cogwheel 13 and pinion 14 is already started very high, so that the desired high speed with simultaneously low static holding moment for the freewheel 16 can be attained especially easily.

We claim:

1. A gear for a conveyor comprising:
   a drive shaft in connection with a drive motor in connection with the conveyor,
   at least one first gear step between said drive shaft and output shaft and a freewheel locking in one direction of rotation, and
   at least one second gear step actuating only the freewheel, and being situated between the freewheel and elements transmitting torque between drive shaft and output shaft during operation.

2. The gear according to claim 1, wherein the second gear step has a transmission ratio of 1:1 or a speed-increasing rate.

3. The gear according to claim 1, wherein the second gear step is a planetary gear.

4. The gear according to claim 1, wherein the second gear step is connected with the drive shaft without elements transmitting torque between drive shaft and output shaft during operation.

* * * * *